(12) United States Patent
Terry et al.

(10) Patent No.: US 10,536,506 B2
(45) Date of Patent: Jan. 14, 2020

(54) WEBPAGE ANALYTICS AND CONTROL (71) Applicant: ServiceNow, Inc., Santa Clara, CA (US)

(72) Inventors: David Terry, San Jose, CA (US); Neha Dube, Campbell, CA (US); Parvathavardhini Shankaranarayanan, Union City, CA (US); Rao Surapaneni, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 329 days.

(21) Appl. No.: 15/588,285

(22) Filed: May 5, 2017

(65) Prior Publication Data
US 2018/0324242 A1 Nov. 8, 2018

(51) Int. Cl.
*H04L 29/08* (2006.01)
*H04L 12/24* (2006.01)
*H04L 12/26* (2006.01)

(52) U.S. Cl.
CPC .......... *H04L 67/025* (2013.01); *H04L 43/062* (2013.01); *H04L 67/10* (2013.01); *H04L 67/22* (2013.01); *H04L 67/34* (2013.01)

(58) Field of Classification Search
CPC ..... H04L 67/025; H04L 43/062; H04L 67/34; H04L 67/22; H04L 67/1095; H04L 67/04; H04L 43/0876; H04L 67/10; G06Q 30/02
See application file for complete search history.

(56) References Cited

U.S. PATENT DOCUMENTS

| | | | | |
|---|---|---|---|---|
| 8,429,243 | B1* | 4/2013 | Wang | G06F 16/958 709/217 |
| 2007/0266145 | A1* | 11/2007 | Nesbitt | G06F 16/958 709/224 |
| 2009/0100154 | A1* | 4/2009 | Stevenson | G06Q 30/02 709/220 |
| 2009/0271514 | A1* | 10/2009 | Thomas | G06F 11/3438 709/224 |
| 2011/0246511 | A1* | 10/2011 | Smith | G06F 16/958 707/769 |
| 2012/0265824 | A1* | 10/2012 | Lawbaugh | G06F 11/3664 709/206 |
| 2014/0379902 | A1* | 12/2014 | Wan | H04L 41/142 709/224 |
| 2018/0123921 | A1* | 5/2018 | O'Connell | H04L 67/02 |

* cited by examiner

*Primary Examiner* — Abdullahi E Salad
(74) *Attorney, Agent, or Firm* — Fletcher Yoder, P.C.

(57) ABSTRACT

Systems and methods for providing web analytics collection and analysis are disclosed. In some embodiments, a central instance control mechanism may be used to enable/disable collection from end-user web browsers. Web analytics may be collected to determine interaction of end-users with web page interfaces to one or more cloud-based service provider offerings. Interaction data may be used by design teams to address problems, improve performance, or generally enhance user experience among other things. Security mechanisms are disclosed to ensure that data may be collected based on contractual requirements or taking into account other restrictions that certain customers may impose on such collection and monitoring.

19 Claims, 5 Drawing Sheets

WEBPAGE ANALYTICS AND CONTROL

TECHNICAL FIELD

Embodiments described herein generally relate to cloud computing and in particular disclosed embodiments relate to collecting, providing, and analyzing metrics regarding user interaction with web pages presented in a web browser. Analysis of the collected data may assist application developers and user-interface designers in future development or updates to user-interface pages. Updates to the design of the user-interface may be used to improve performance, functionality, user experience, and other aspects of interactive web pages.

BACKGROUND ART

Cloud computing relates to the sharing of computing resources that are generally accessed via the Internet by a user using a web browser interface. In particular, cloud computing infrastructure allows users to access a shared pool of computing resources, such as servers, storage devices, networks, applications, and/or other computing based services. By doing so, users, such as individuals and/or enterprises, are able to access computing resources on demand that are located at remote locations in order to perform a variety computing functions that include storing and/or processing computing data. For enterprise and other organization users, cloud computing provides flexibility in accessing cloud computing resources without accruing upfront costs, such as purchasing network equipment, and investing time in establishing a private network infrastructure. Instead, by utilizing cloud computing resources, users are able redirect their resources to focus on core business functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of business and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate business operations without maintaining network infrastructure and/or allocating computing resources normally associated with these functions.

Within the context of cloud computing solutions, users often interact with applications hosted in an instance of the cloud infrastructure by using a web browser interface to web pages. This is similar to how a user typically navigates the Internet. However, if the main (or only) interface to cloud-based applications is a web browser, performance aspects of the web pages require a higher level of scrutiny as to their design and implementation as compared to standard web pages. Stated differently, the casual user "browsing" the Internet will likely have very different performance criteria than corporate users connecting to applications that are mission critical to their business. Accordingly, it may be desirable to collect and analyze web analytics data in production systems or simulation systems to determine how a user is interacting with the overall user-interface and have enough detail to determine user interaction information about particular web pages.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed below.

In one embodiment, a cloud-based computer system, includes one or more memory partitions; and one or more network interfaces communicatively coupled to one or more processing units and to the one or more memory partitions; wherein the one or more memory partitions comprise computer instructions that when executed by the one or more processing units cause the cloud-based computer system to provide at least one web analytics receiver instance and at least one web analytics server, wherein the at least one web analytics receiver instance is communicatively coupled, via the one or more network interfaces, to a remotely executing client application, the at least one web analytics receiver instance configured to: receive usage analytical data from an instrumented web page associated with the remotely executing client application, the usage analytical data indicating metrics regarding activity at the instrumented web page; perform validation on the received usage analytical data to identify validated analytical data; and forward at least a portion of the validated analytical data to the at least one web analytics server; and wherein the at least one web analytics server is configured to: receive the validated analytical data forwarded from the at least one web analytics receiver instance; analyze the validated analytical data to identify metrics regarding navigation and information entry into the instrumented web page; store at least a portion of the validated analytical data in a data store; and generate reports indicating interaction with the instrumented web page, the generation of reports based in part on the stored validated analytical data.

In a second embodiment, a cloud-based web analytics collection and analysis method is disclosed. The method includes receiving, at a web analytics receiver instance, analytical data from an instrumented web page, the analytical data indicating metrics regarding activity at the instrumented web page; performing validation, at the web analytics receiver instance, on the received analytical data to identify validated analytical data; and forwarding at least a portion of the validated analytical data from the web analytics receiver instance to at least one web analytics server, wherein the at least one web analytics server is configured to: analyze the validated analytical data to identify metrics regarding navigation and information entry into the instrumented web page; store at least a portion of the validated analytical data in a data store; and generate reports, based on data from the data store, to indicate activity at the instrumented web page.

In yet another embodiment, a cloud-based computer system, includes one or more memory partitions; and one or more network interfaces communicatively coupled to one or more processing units and the one or more memory partitions; wherein the one or more memory partitions comprise computer instructions that when executed by the one or more processing units cause the cloud-based computer system to provide at least one receiver instance and at least one central instance control module, wherein the at least one receiver instance is communicatively coupled, via the one or more network interfaces, to a remotely executing client application, the at least one receiver instance configured to: receive analytical data from an instrumented web page, the analytical data indicating metrics regarding activity at the instrumented web page; perform validation on the received analytical data to identify validated analytical data; and forward at least a portion of the validated analytical data to at least one web analytics server; and wherein the at least one central instance control module is configured to enable and disable collection of data from the instrumented web page at least in part by initiating an indication to the remotely executing client application to start or stop executing instrumented code in the instrumented web page.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Various example embodiments are disclosed herein that allow for collection of web analytics in a cloud-based computer system hosting a plurality of customer instances, each customer instance having one or more end-users interfacing via web pages that may be instrumented to allow for enhanced collection of interaction data. Instrumented pages may be provided initially as part of a service provider offering or may be customer designed and implemented pages. For example, a customer may develop an application to be used "in-house" and may utilize an automated utility to instrument the customer developed web pages to interface with a service provider web analytics capability. In this manner, the customer may benefit from analysis and usage reports (generated via the cloud-based infrastructure provided by the cloud service provider) to enhance their own application interface, for example.

Figure 1:
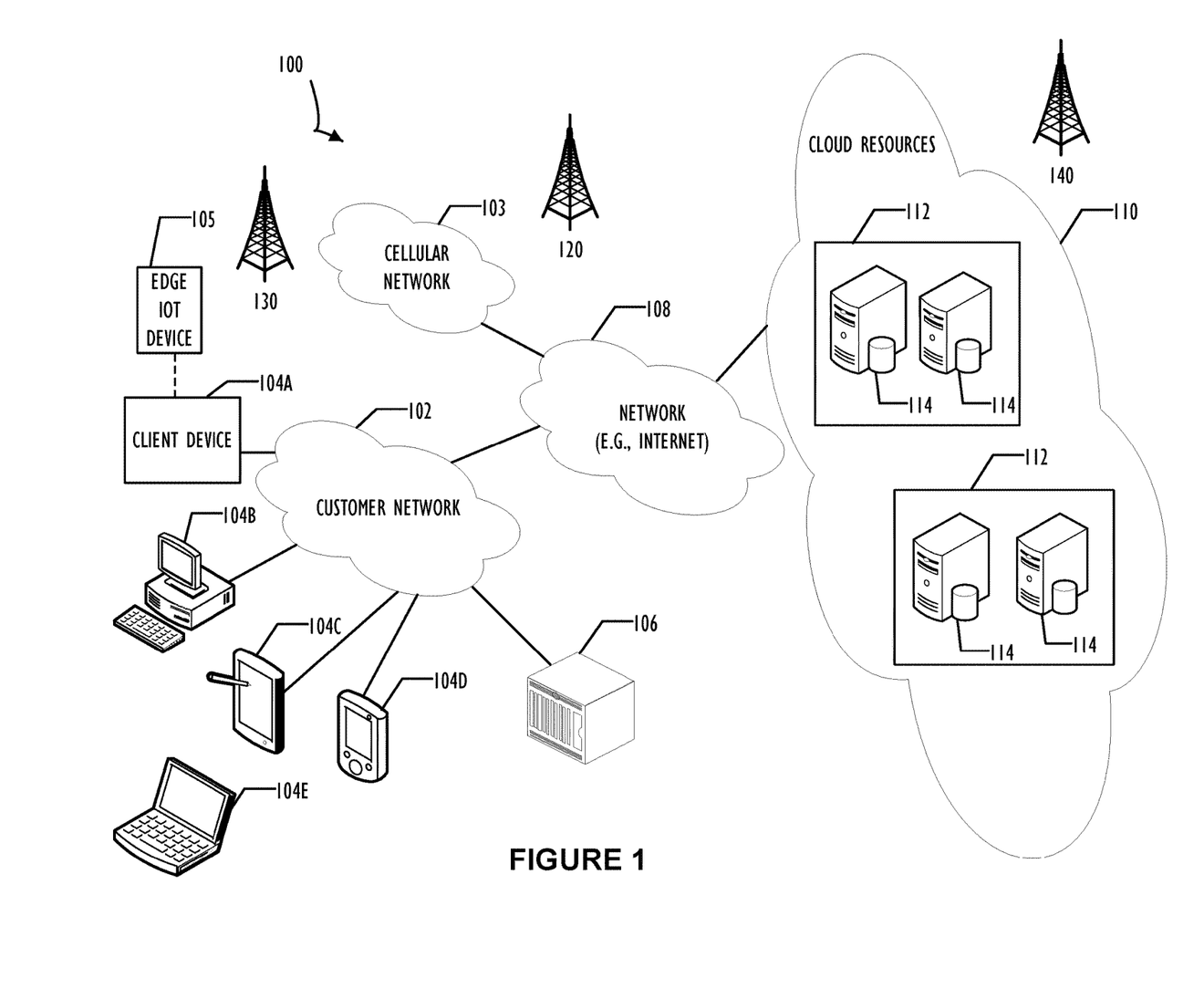
FIG. 1 illustrates a block diagram of an embodiment of a cloud computing infrastructure 100 where embodiments of the present disclosure may operate.

FIG. 1 illustrates a block diagram of an embodiment of a cloud computing infrastructure 100 where embodiments of the present disclosure may operate. Cloud computing infrastructure 100 comprises a customer network 102, network 108, and a cloud resources platform/network 110. In one embodiment, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi® networks (Wi-Fi is a registered trademark of the Wi-Fi Alliance) and Bluetooth® (BLUETOOTH is a registered trademark of Bluetooth Special Interest Group)). In another embodiment, customer network 102 represents an enterprise network that could include or be communicatively coupled to one or more local area networks (LANs), virtual networks, data centers and/or other remote networks (e.g., 108, 112). As shown in FIG. 1, customer network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that customer network 102 includes a local compute resource 106 that may include a server, access point, router, or other device configured to provide for local computational resources and/or facilitate communication amongst networks and devices. For example, local compute resource 106 may be one or more physical local hardware devices configured to communicate with wireless network devices and/or facilitate communication of data between customer network 102 and other networks such as network 108 and cloud resources platform/network 110. Local compute resource 106 may also facilitate communication between other external applications, data sources, and services, and customer network 102. Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact other mobile devices or with non-mobile devices such as desktop computer 104B and various types of client device 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WAN), the Internet, and/or other remote networks, in order to transfer data between client devices 104A-D and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio based network as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via customer network 102 and network 108. The cloud resources platform/network 110 acts as a platform that provides additional computing resources to the client devices 104A-E and/or customer network 102. For example, by utilizing the cloud resources platform/network 110, users of client devices 104A-E may be able to build and execute applications, such as automated processes for various business, IT, and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java Virtual Machine), and/or a database server instance (e.g., a unitary MySQL catalog).

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causes outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud resources platform/network 110, and customer-driven upgrade schedules. An example of implementing a customer instance within a multi-instance cloud architecture will be discussed in more detail below when describing FIG. 2.

In one embodiment, utilizing a multi-instance cloud architecture, a first customer instance may be configured with a client side application interface such as, for example, a web browser executing on a client device (e.g., one of client devices 104A-E of FIG. 1). In this example, an end-user may interact with the web browser to use a cloud-based service offering such as a help desk problem reporting and tracking system for a corporation. To improve end-user experience, the web pages executing within a web browser of a client device (e.g., one of client devices 104A-E of FIG. 1) may optionally execute instrumented code to obtain information about how a user is interacting with the application interface. For example, information about how a user is navigating through different display portions of the help desk application and how a user is entering data about problem reports into the help desk application may be collected. As discussed briefly above, tracking how a user is interacting with an application may provide valuable insight for application designer's as to how to improve the overall end-user experience. Accordingly, according to disclosed embodiments the web analytics collection and analysis may be used by different groups within a customer organization or within a cloud service provider development organization to direct future development updates for improved user interaction via web page based applications. In some cases, collection of the information about user interaction may be prohibited or undesirable and may be controlled (e.g., turned on and off) from a central instance in communication with the one or more hosted customer instances and in turn client device web browsers. Details of this will be discussed below with reference to FIGS. 3-6.

Figure 2:
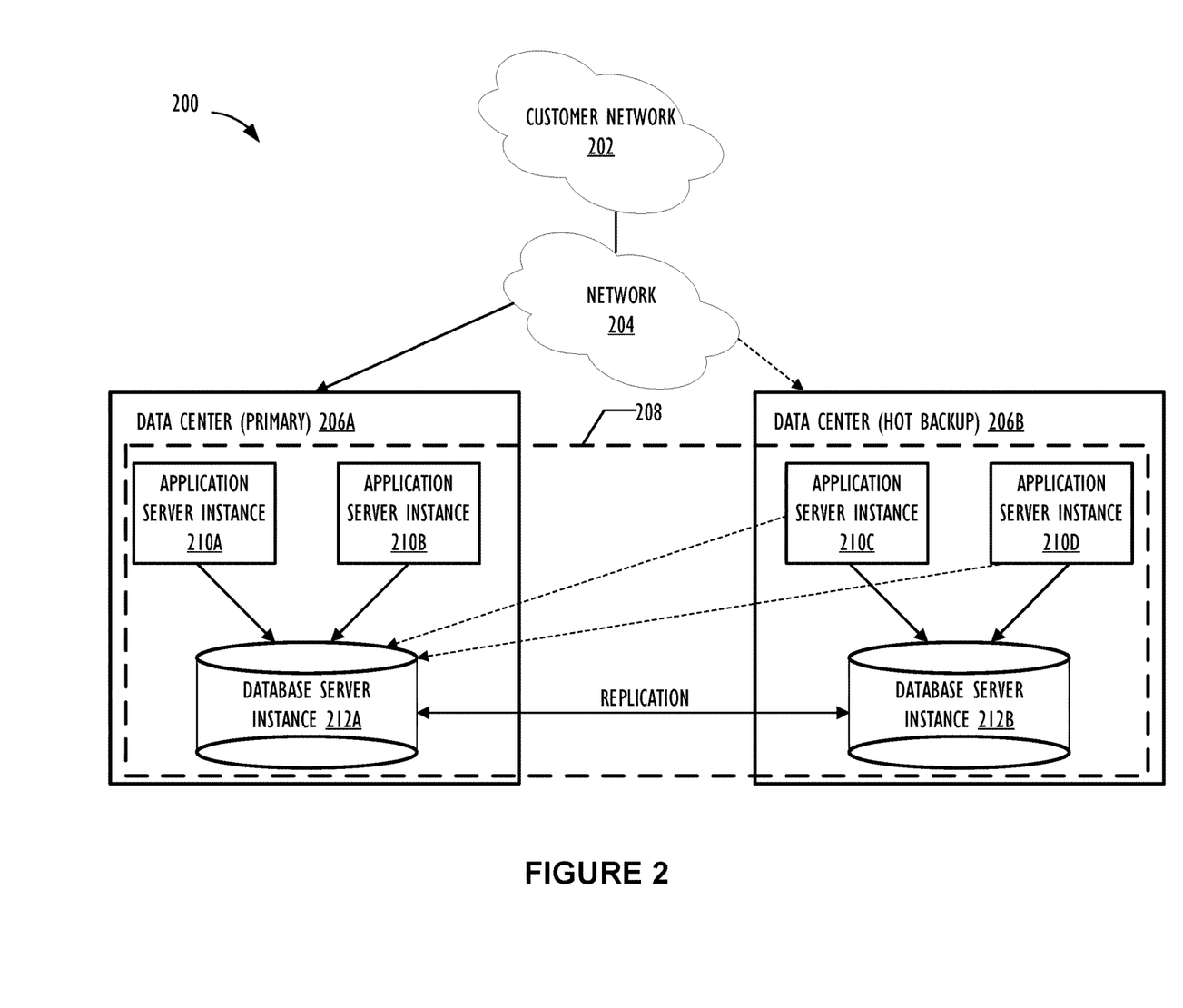
FIG. 2 illustrates a block diagram of an embodiment of a multi-instance cloud architecture 200 where embodiments of the present disclosure may operate.

FIG. 2 illustrates a block diagram of an embodiment of a multi-instance cloud architecture 200 where embodiments of the present disclosure may operate FIG. 2 illustrates that the multi-instance cloud architecture 200 includes a customer network 202 that connects to two data centers 206a and 206b via network 204. Customer network 202 and network 204 may be substantially similar to customer network 102 and network 108 as described in FIG. 1, respectively. Data centers 206a and 206b can correspond to FIG. 1's data centers 112 located within cloud resources platform/network 110. Using FIG. 2 as an example, a customer instance 208 is composed of four dedicated application server instances 210a-210d and two dedicated database server instances 212a and 212b. Stated another way, the application server instances 210a-210d and database server instances 212a and 212b are not shared with other customer instances 208. Other embodiments of the multi-instance cloud architecture 200 could include other types of dedicated server instances, such as a web server instance. For example, the customer instance 208 could include the four dedicated application server instances 210a-210d, two dedicated database server instances 212a and 212b, and four dedicated web server instances (not shown in FIG. 2).

To facilitate higher availability of the customer instance 208, application server instances 210a-210d and database server instances 212a and 212b are shown to be allocated to two different data centers 206a and 206b, where one of data centers 206 may act as a backup data center. In reference to FIG. 2, data center 206a acts as a primary data center that includes a primary pair of application server instances 210a and 210b and primary database server instance 212a for customer instance 208, and data center 206b acts as a secondary data center to back up primary data center 206a for a customer instance 208. To back up primary data center 206a for customer instance 208, secondary data center 206 includes a secondary pair of application server instances 210c and 210d and a secondary database server instance 212b. Primary database server instance 212a is able to replicate data to secondary database server instance 212b. As shown in FIG. 2, primary database server instance 212a replicates data to secondary database server instance 212b using a replication operation such as, for example, a Master-Master MySQL Binlog replication operation. The replication of data between data centers could be implemented in real time or by implementing full backup weekly and daily incremental backups in both data centers 206a and 206b. Having both a primary data center 206a and secondary data center 206b allows data traffic that typically travels to the primary data center 206a for the customer instance 208 to be diverted to the second data center 206b during a failure and/or maintenance scenario. Using FIG. 2 as an example, if application server instances 210a and 210b and/or primary data server instance 212a fails and/or is under maintenance, data traffic for customer instances 208 can be diverted to secondary application server instances 210c and 210d and secondary database server instance 212b for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only examples to facilitate ease of description and explanation.

Figure 3:
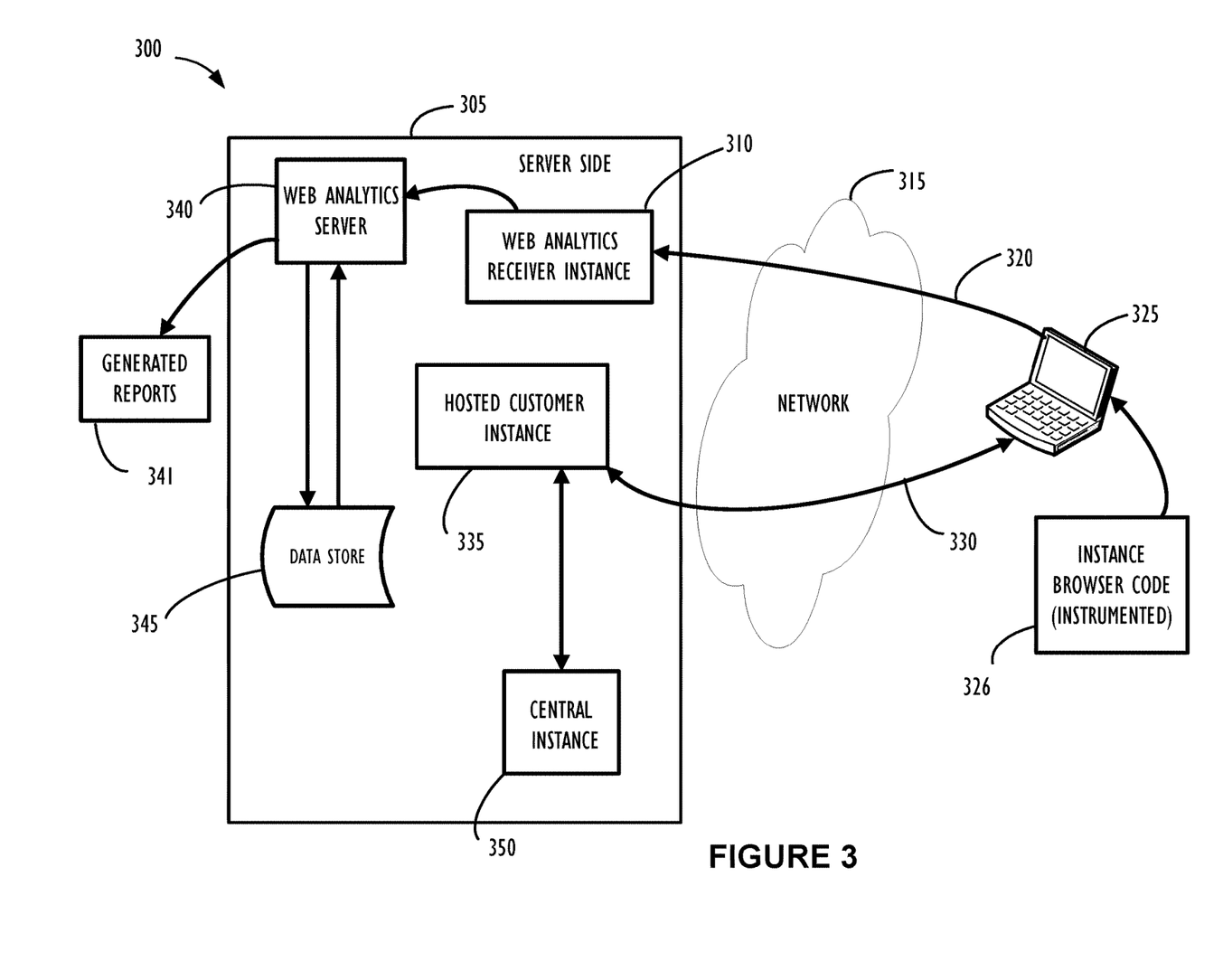
FIG. 3 illustrates a block diagram 300 of components and interactions of those components that may be configured to capture web analytics according to an embodiment of the present disclosure.

FIG. 3 illustrates a block diagram 300 of an embodiment of a network environment including a hosted customer instance 335 and a web analytics server 340 that may be used to support the collection and analysis of web analytics according to some disclosed embodiments. As illustrated in FIG. 3, network 315 is a further example of a network such as the Internet or one or more corporate networks such as network 108 of FIG. 1 and network 204 of FIG. 2. Further, as illustrated in FIG. 3, client side devices such as client device 325 may be configured to communicate with one or more server side 305 applications or functions. In this example, network 315 may represent a single network or a combination of networks that may be configured to transmit information between a client device 325 and a hosted customer instance 335 as illustrated by bidirectional flow line 330. As explained briefly above, a cloud infrastructure may be configured to support many hosted customer instances (e.g., 335) and each hosted customer instance 335 may be configured to support many client devices (e.g., 325), however, for simplicity only one of each is illustrated in FIG. 3. In some cases, based on configuration, client device 325 may have instrumented browser code 326 configured to capture and transmit web analytics information to a web analytics receiver instance 310 via network 315 as illustrated by unidirectional flow line 320. Upon receipt and validation at web analytics receiver instance 310, information pertaining to analytics may be forwarded to web analytics server 340. Control and collection of web analytics information for a given hosted customer instance (e.g., 335) and a given client device (e.g., 325) may be controlled by configuration information and commands issued by central instance 350. Collected web analytics information may be further processed at web analytics server 340 and stored in data store 345. Further, information collected and stored may be used to generate reports 341 based on analytics collection and analysis. As mentioned above, these reports may provide information as to how users are interacting with different web pages. One example benefit of such a report may be to assist application developers in design or update activities to enhance end-user experience.

Block diagram 300 illustrates an example of a portion of a service provider cloud infrastructure (e.g., cloud resources 110 of FIG. 1) connected via a network 315 such as the Internet to a customer device 325 to provide a user interface to network applications, executing within a hosted customer instance 335, via a web browser as an example. Network 315 is a further example of a network such as network 108 of FIG. 1 and network 204 of FIG. 2. Details of these networks are discussed above with reference to each of FIGS. 1 and 2 and are not discussed further here. Service provider cloud infrastructure hosted customer instance 335 illustrates cloud resources and server instances executing on server side 305 that are similar to those explained with respect to FIG. 2 but illustrated here to show support for a web analytics collection and reporting capability for a single hosted customer instance 335. Of course, cloud provider infrastructure may be configured to support a plurality of end-user devices such as end-user device 325 concurrently, each in communication with the single hosted customer instance 335. Also, cloud provider infrastructures may be configured to support any number of client instances such as hosted customer instance 335 concurrently with each of them in communication with one or more end-user devices.

Utilizing an infrastructure as illustrated in FIG. 3, it may be possible to collect metrics from client side code (browser code) and allow product or development managers to study the way a particular user-interface is used by end-users. Web analytics may include information to identify button clicks, application specific navigation, custom events, and other information collected by instrumented portions of client side web page code. Without collection of web analytics, it may be only possible to analyze historical server side artifacts of a user-interface action.

For security, it may be desirable to control what analytics data is collected and from what client devices (e.g., 325) the web analytics data is collected. For example, some customers may contractually prohibit collection and analysis of web analytics data while other customers, such as government or financial customers, may have security requirements that prevent collection. As illustrated in FIG. 3, standard application communication between hosted customer instance 335 and client device 325 is communicated through a bidirectional flow line 330 while web analytics data is communicated through a different communication channel (e.g., unidirectional flow line 320). Further, web analytics information may be collected at web analytics receiver instance 310 rather than at hosted customer instance 335. This may be beneficial in that web analytics receiver instance 310 may be configured to receive, validate, and relay web analytics information to web analytics server 340. By performing functions of web analytics outside of hosted customer instance 335, impact to execution and performance of applications executing within hosted customer instance 335 may be minimized. Additionally, web analytics receiver instance 310 may be configured to perform health checks on web analytics server 340 which may be configured as a Piwik server for example.

Additionally, to address security, performance, and other concerns, central instance 350 may be configured to control which client devices classes (e.g., mobile or web) and which hosted customer instances (e.g., 335) are collecting web analytics data at any point in time. For example, central instance 350 may communicate to hosted customer instances and code executing on client devices via events or an asynchronous message bus (AMB) to centrally control web analytics collection at each end-user device. That is, central instance 350 may be configured to turn on/off web analytics collection for particular client devices types and hosted customer instances as needed. Central instance 350 may provide provision control to customer instances and only appropriate production customer instances will be configured to publish web analytics events. Additionally, central instance 350 may be configured to de-provision a hosted customer instance upon receipt of a customer requesting such action.

To address web analytics collection and analysis capabilities as outlined above, it may be desirable to configure an infrastructure such as those outlined in FIGS. 1-3 to: a) collect web analytics from browser sessions connected to hosted customer instances (e.g., either production grade hosted instances or subprod instances) b) provide instrumentation application program interfaces (APIs) to allow application developers to control what data is collected via web page instrumentation code; c) implement a blacklist feature whereby web analytics are not collected for instances that are on the blacklist; d) store web analytics in a service provider data store for further analysis and retrieval; e) provide a relay service such as web analytics receiver instance 310 so that the web analytics collection service is not exposed directly to an external network, such as network 315; and f) provide reporting capability from server side 305 for properly authenticated users of a service provider offering.

Figure 4:
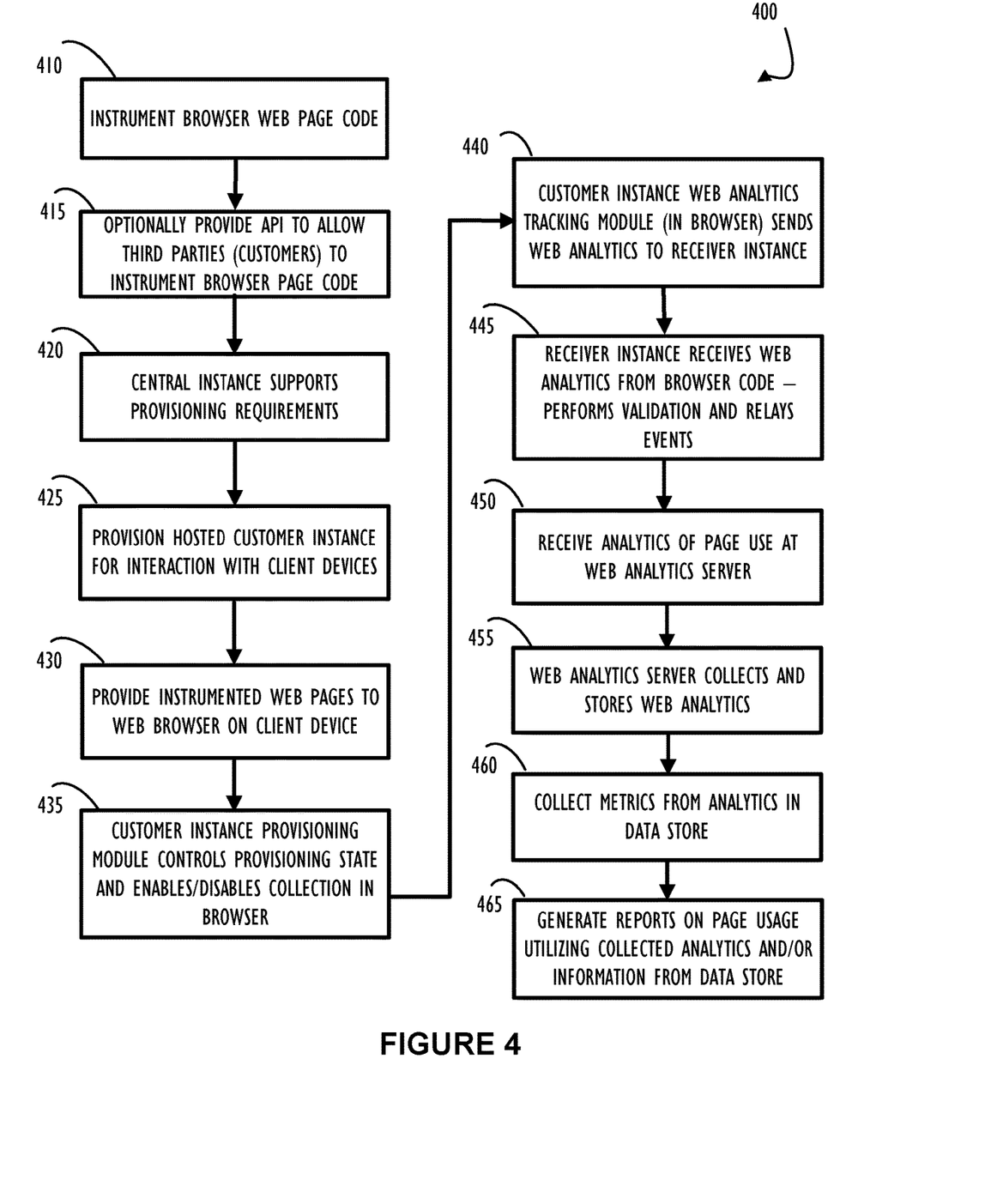
FIG. 4 illustrates a flowchart of an embodiment of a method 400 of collecting and analyzing web analytics data from a plurality of end-user interfaces and client instances including a central instance to control data collection points according to one or more disclosed embodiments.

FIG. 4 illustrates a flowchart of an embodiment of method 400 explaining one possible flow for collecting and analyzing web analytics, including central instance control, that may be implemented, for example on the infrastructure of FIGS. 1-3, according to one or more disclosed embodiments. Beginning at block 410, web page code to be executed in a web browser may be instrumented to include code to collect web analytics while in use. For example, instrumented code may include code to perform a base functionality and have additional code to execute only when configured to collect web analytics. This conditionally executed code may be similar to trace code or debug code in that it provides information in addition to the base functionality of code designed to provide business logic for an application. Block 415 indicates that some embodiments may include an optional application program interface (API) or other means to allow third parties or customers developing applications that are not provided as part of a cloud service provider product offering to be instrumented such that they may interact with the web analytics infrastructure provided by the cloud service provider. Block 420 indicates that a central instance (e.g., central instance 350 of FIG. 3) may be configured to support provisioning requirements and possibly control when specific hosted customer instances (e.g., hosted customer instance 335 of FIG. 3) are to collect web analytics data. That is, a central instance (e.g., 350) may initiate a message or event to be received at a client device (e.g., 325) to instruct the web browser executing on that device to begin or cease execution of the above mentioned conditional code (i.e., instrumented code as used in this embodiment). Block 425 indicates that a hosted customer instance (e.g., 335) may be provisioned and configured to communicate with end-user client devices (e.g., 325) of a customer and execute applications within the cloud infrastructure as required for that customer. At block 430, instrumented web pages (e.g., 326) are made available for execution on a web browser of a client device (e.g., 325). The web pages, in this example, are instrumented web pages (e.g., 326) that may have been downloaded to the client device (e.g., 325) as part of the provisioning process or were already installed on the client device (e.g., 325). Block 435 illustrates that a customer instance provisioning module that may be configured to coordinate with central instance 350 for example controls the provisioning state (e.g., collection on/off) and enables or disables collection in web browsers associated with each provisioning request. Block 440 indicates that web analytics collection code may execute on the client side portion of a hosted customer instance and be loaded from the customer instance as instrumented web pages (e.g., 326) to be executed in a web browser of a client device (e.g., 325). The instrumented code (e.g., 326), when enabled based on the client browser configuration as controlled by the central instance (e.g., 350), sends collected web analytics information to a web analytics receiver instance (e.g., 310). Block 445 illustrates that a web analytics receiver instance (e.g., 310) may be configured to receive the web analytics information from the browser code and perform validation to ensure that data complies with the type of data being expected. For example, a web analytics receiver instance (e.g., 310) may be configured to perform additional security and filtering of received information so that only proper information and events are forwarded to a web analytics server (e.g., 340). Block 450 indicates that a web analytics server (e.g., 350) receives the analytics that indicate page use and other user interaction information pertaining, in this example, to the user-interface. Flow continues to block 455 where further processing and possible storing of web analytics may be performed. Web analytics data may be stored for historical analysis and/or comparison to other metric data for example as illustrated in block 460. Block 465 illustrates that reports may be generated utilizing collected information and/or information available in the data store from previously collected web analytics. As explained above, user-interaction information may be used to enhance, trouble shoot, or in other ways update web pages provided as part of a user interface among other things.

Figure 5:
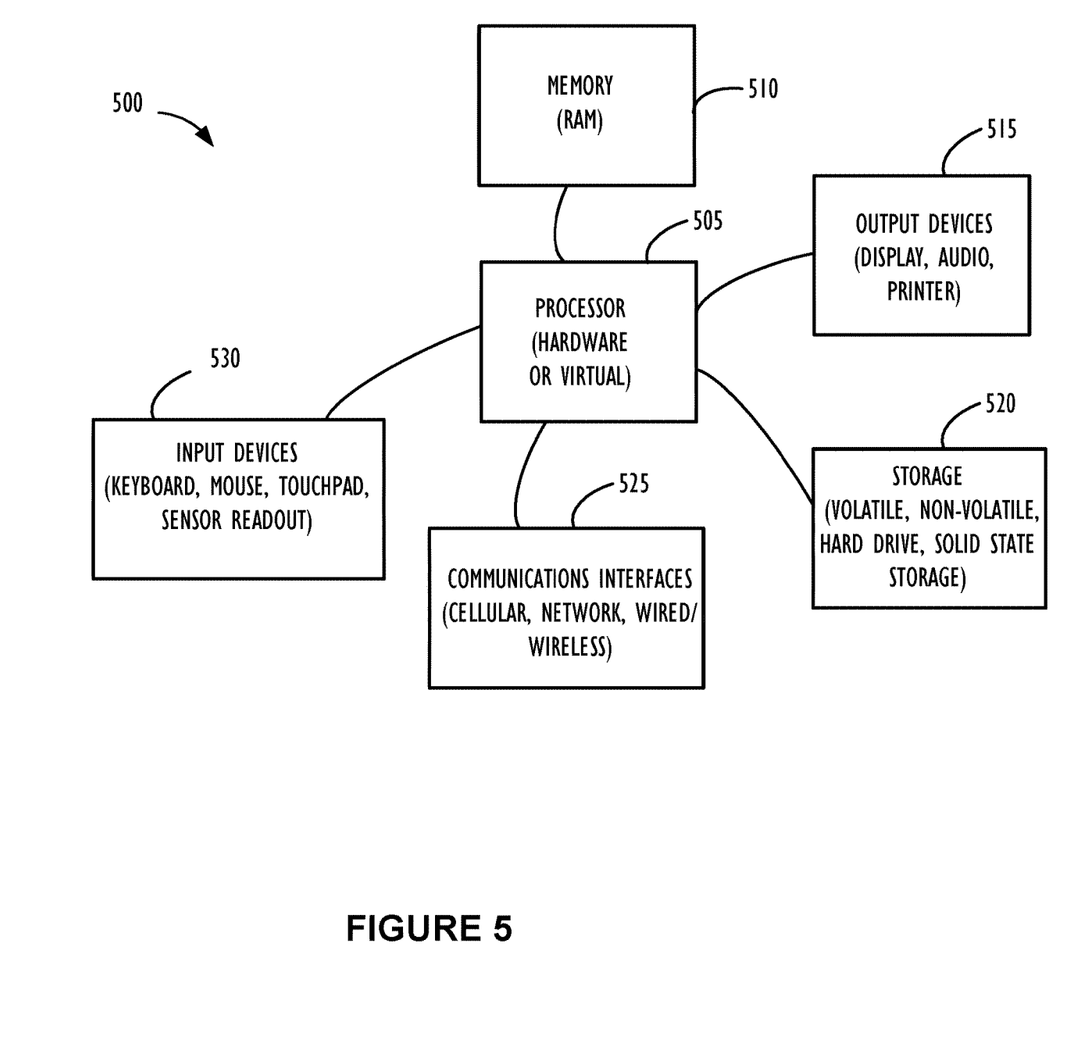
FIG. 5 illustrates a high-level block diagram 500 of a processing device (computing system) that may be used to implement one or more disclosed embodiments.

FIG. 5 illustrates a high-level block diagram 500 of a processing device (computing system) that may be used to implement one or more disclosed embodiments (e.g., service provider cloud infrastructure 110, client devices 104A-104E, server instances 112, data centers 206A-B, etc.). For example, computing device 500 illustrated in FIG. 5 could represent a client device or a physical server device and include either hardware or virtual processor(s) depending on the level of abstraction of the computing device. In some instances (without abstraction) computing device 500 and its elements as shown in FIG. 5 each relate to physical hardware and in some instances one, more, or all of the elements could be implemented using emulators or virtual machines as levels of abstraction. In any case, no matter how many levels of abstraction away from the physical hardware, computing device 500 at its lowest level may be implemented on physical hardware. As also shown in FIG. 5, computing device 500 may include one or more input devices 530, such as a keyboard, mouse, touchpad, or sensor readout (e.g., biometric scanner) and one or more output devices 515, such as displays, speakers for audio, or printers. Some devices may be configured as input/output devices also (e.g., a network interface or touchscreen display). Computing device 500 may also include communications interfaces 525, such as a network communication unit that could include a wired communication component and/or a wireless communications component, which may be communicatively coupled to processor 505. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 5, processing device 500 includes a processing element such as processor 505 that contains one or more hardware processors, where each hardware processor may have a single or multiple processor cores. In one embodiment, the processor 505 may include at least one shared cache that stores data (e.g., computing instructions) that are utilized by one or more other components of processor 505. For example, the shared cache may be a locally cached data stored in a memory for faster access by components of the processing elements that make up processor 505. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 5, the processing elements that make up processor 505 may also include one or more other types of hardware processing components, such as graphics processing units (GPU), application specific integrated circuits (ASICs), field-programmable gate arrays (FPGAs), and/or digital signal processors (DSPs).

FIG. 5 illustrates that memory 510 may be operatively and communicatively coupled to processor 505. Memory 510 may be a non-transitory medium configured to store various types of data. For example, memory 510 may include one or more storage devices 520 that comprise a non-volatile storage device and/or volatile memory. Volatile memory, such as random access memory (RAM), can be any suitable non-permanent storage device. The non-volatile storage devices 520 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 520 may be used to store overflow data if allocated RAM is not large enough to hold all working data. The non-volatile storage devices 520 may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processor 505. In one embodiment, the compiling process of the software program may transform program code written in a programming language to another computer language such that the processor 505 is able to execute the programming code. For example, the compiling process of the software program may generate an executable program that provides encoded instructions (e.g., machine code instructions) for processor 505 to accomplish specific, non-generic, particular computing functions.

After the compiling process, the encoded instructions may then be loaded as computer executable instructions or process steps to processor 505 from storage 520, from memory 510, and/or embedded within processor 505 (e.g., via a cache or on-board ROM). Processor 505 may be configured to execute the stored instructions or process steps in order to perform instructions or process steps to transform the computing device into a non-generic, particular, specially programmed machine or apparatus. Stored data, e.g., data stored by a storage device 520, may be accessed by processor 505 during the execution of computer executable instructions or process steps to instruct one or more components within the computing device 500.

A user interface (e.g., output devices 515 and input devices 530) can include a display, positional input device (such as a mouse, touchpad, touchscreen, or the like), keyboard, or other forms of user input and output devices. The user interface components may be communicatively coupled to processor 505. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 500 may comprise other components well known in the art, such as sensors, powers sources, and/or analog-to-digital converters, not explicitly shown in FIG. 5.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application

What is claimed is:

1. A cloud-based computer system, comprising:
one or more memory partitions; and
one or more network interfaces communicatively coupled to one or more processing units and to the one or more memory partitions;
wherein the one or more memory partitions comprise computer instructions that when executed by the one or more processing units cause the cloud-based computer system to provide at least one web analytics receiver instance and at least one web analytics server,
wherein the at least one web analytics receiver instance is communicatively coupled, via the one or more network interfaces, to a remotely executing client application, the at least one web analytics receiver instance configured to:
receive usage analytical data from an instrumented web page associated with the remotely executing client application, the usage analytical data indicating metrics regarding activity at the instrumented web page;
perform validation on the received usage analytical data to identify validated analytical data; and
forward at least a portion of the validated analytical data to the at least one web analytics server; and
wherein the at least one web analytics server is configured to:
receive the validated analytical data forwarded from the at least one web analytics receiver instance;
analyze the validated analytical data to identify metrics regarding navigation and information entry into the instrumented web page;
store at least a portion of the validated analytical data in a data store; and
generate reports indicating interaction with the instrumented web page, the generation of reports based in part on the stored validated analytical data.

2. The cloud-based computer system of claim 1, wherein the one or more memory partitions further comprise computer instructions to cause the cloud-based computer system to provide at least one hosted customer instance communicatively coupled to the remotely executing client application.

3. The cloud-based computer system of claim 2, wherein the one or more memory partitions further comprise computer instructions to cause the cloud-based computer system to provide a central instance communicatively coupled to the at least one hosted customer instance.

4. The cloud-based computer system of claim 3, wherein the central instance is configured to initiate provisioning of the hosted customer instance.

5. The cloud-based computer system of claim 3, wherein the central instance is configured to send a collection indication, via the hosted customer instance, to the remotely executing client application, the collection indication to stop or start collection of usage analytical data from the instrumented web page.

6. The cloud-based computer system of claim 5, wherein the computer instructions to cause the cloud-based computer system to send the collection indication comprise computer instructions to cause the cloud-based computer system to send information via an asynchronous message bus (AMB).

7. The cloud-based computer system of claim 5, wherein the collection indication comprises an event message.

8. The cloud-based computer system of claim 1, wherein the at least one web analytics receiver instance is communicatively coupled to the remotely executing client application using a unidirectional communication path.

9. The cloud-based computer system of claim 2, wherein the at least one hosted customer instance is communicatively coupled to the remotely executing client application using a bidirectional communication path.

10. The cloud based computer system of claim 9, wherein the at least one web analytics receiver instance is communicatively coupled to the remotely executing client application using a unidirectional communication path.

11. A cloud-based web analytics collection and analysis method, comprising:
  receiving, at a web analytics receiver instance, usage analytical data from an instrumented web page associated with a remotely executing client application, the analytical data indicating metrics regarding activity at the instrumented web page;
  performing validation, at the web analytics receiver instance, on the received analytical data to identify validated analytical data; and
  forwarding at least a portion of the validated analytical data from the web analytics receiver instance to at least one web analytics server,
  wherein the at least one web analytics server is configured to:
    analyze the validated analytical data to identify metrics regarding navigation and information entry into the instrumented web page;
    store at least a portion of the validated analytical data in a data store; and
    generate reports, based on the validated analytical data from the data store, to indicate interaction with the instrumented web page.

12. A cloud-based computer system, comprising:
  one or more memory partitions; and
  one or more network interfaces communicatively coupled to one or more processing units and the one or more memory partitions;
  wherein the one or more memory partitions comprise computer instructions that when executed by the one or more processing units cause the cloud-based computer system to provide at least one receiver instance, at least one web analytics server, and at least one central instance control module,
  wherein the at least one receiver instance is communicatively coupled, via the one or more network interfaces, to a remotely executing client application, the at least one receiver instance configured to:
    receive analytical data from an instrumented web page, the analytical data indicating metrics regarding activity at the instrumented web page;
    perform validation on the received analytical data to identify validated analytical data; and
    forward at least a portion of the validated analytical data to the at least one web analytics server;
  wherein the at least one web analytics server is configured to:
    receive the validated analytical data forwarded from the at least one receiver instance;
    analyze the validated analytical data to identify metrics regarding navigation and information entry into the instrumented web page;
    store at least a portion of the validated analytical data in a data store; and
    generate reports based on the validated analytical data stored in the data store to indicate activity at the instrumented web page; and
  wherein the at least one central instance control module is configured to enable and disable collection of data from the instrumented web page at least in part by initiating an indication to the remotely executing client application to start or stop executing instrumented code in the instrumented web page.

13. The cloud-based computer system of claim 12, wherein the at least one web analytics server is communicatively coupled to the at least one receiver instance via a unidirectional communication path.

14. The cloud-based computer system of claim 12, wherein the at least one receiver instance is communicatively coupled to the remotely executing client application via a unidirectional communication path.

15. The cloud-based computer system of claim 12, wherein the one or more memory partitions further comprise computer instructions to cause the cloud-based computer system to provide at least one hosted customer instance communicatively coupled to the remotely executing client application.

16. The cloud-based computer system of claim 15, wherein the at least one hosted customer instance is communicatively coupled to the remotely executing client application via a bidirectional communication path.

17. The cloud-based computer system of claim 15, wherein initiating an indication to the remotely executing client application to start or stop executing instrumented code in the instrumented web pages comprises sending the indication via the hosted customer instance.

18. The cloud-based computer system of claim 12, wherein initiating an indication to the remotely executing client application to start or stop executing instrumented code in the instrumented web pages comprises sending the indication via an asynchronous message bus (AMB).

19. The cloud-based computer system of claim 12, wherein initiating an indication to the remotely executing client application to start or stop executing instrumented code in the instrumented web page comprises sending the indication via an event.

* * * * *